Aug. 15, 1950 O. K. KOLB ET AL 2,518,556

SHIELDING ARRANGEMENT FOR MAGNETIC SOUND APPARATUS

Filed June 16, 1949

Inventors:
Otto Kurt Kolb and
Eric Owen Smith

By: Pierce, Scheffler & Parker,
Attorneys.

Patented Aug. 15, 1950

2,518,556

UNITED STATES PATENT OFFICE 2,518,556

SHIELDING ARRANGEMENT FOR MAGNETIC SOUND APPARATUS

Otto Kurt Kolb, Chiswick, London, and Eric Owen Smith, Chelmsford, England, assignors to British Acoustic Films Limited, London, England, a British company Application June 16, 1949, Serial No. 99,540
In Great Britain March 1, 1949

6 Claims. (Cl. 179—100.2)

Figure 1:
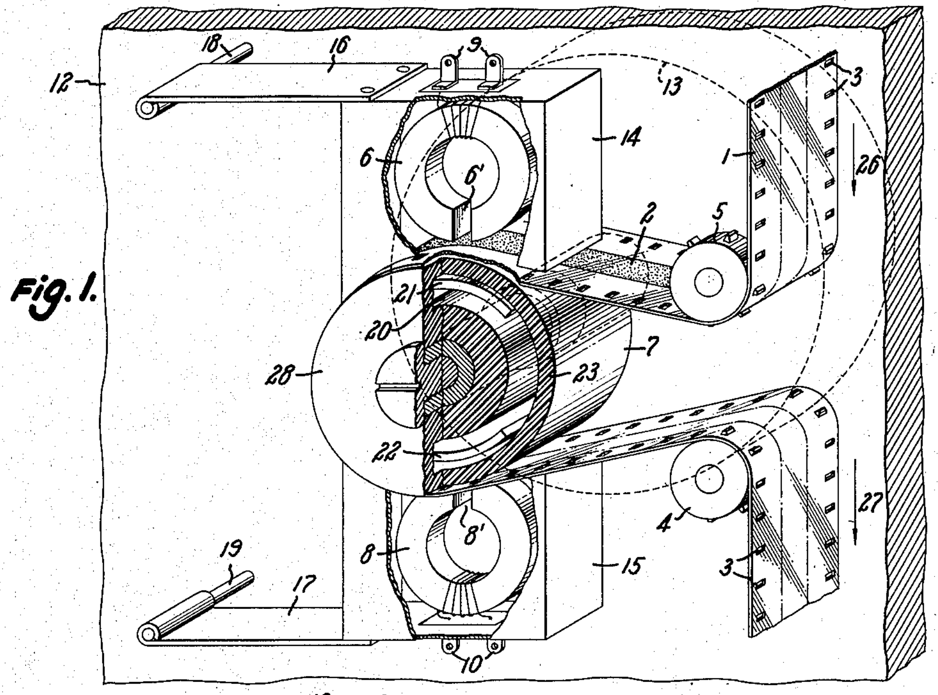

This invention relates to improvements in magnetic screening or shielding arrangements for magnetic sound apparatus of the kind in which sound is recorded on and reproduced from a film, tape or the like sound record carrier impregnated or coated with a magnetizable layer or layers.

Apparatus of this kind is known in which a magnetic recording head is mounted adjacent to a magnetic reproducing or playback head and the recording medium is drawn past the two stationary heads so that the sound signals impressed by the recording head can be audibly reproduced by the playback head a fraction of a second afterwards, for example, for monitoring purposes.

The possibility of monitoring the recorded sound only a fraction of a second after it has been impressed on the sound record carrier is a great advantage possessed by a magnetic recording system over a photographic recording system. In the latter type of system the photographic sound track has to be developed and printed before it can be played back while the monitoring during the actual recording can only take place, for example, from the recording amplifier and not from the actual recorded sound track, as with a magnetic system.

In the known magnetic recording and reproducing apparatus the two heads are magnetically screened or shielded from each other in order to prevent inductive or magnetic interference (for example, that known in the art as cross-talk) between them; this magnetic screening consists of casings or cans made of magnetically soft material (i. e. a material of high magnetic permeability and low magnetic retentivity), such as Swedish iron or the alloys known under the registered trade-marks of Mumetal and Permalloy, and these cans enclose the heads completely except for small slots which allow for entry and exit of the tape.

For sound film apparatus and, in particular, where the sound film has to be synchronized with a complementary picture film it has been found that the best means to obtain a constant film speed with a very low flutter content is to draw the film around a drum coupled to a flywheel, which is thus driven by the film, and to effect the recording and reproducing on the film passing around the drum.

With such apparatus, the magnetic recording and reproducing heads have to be mounted so that they ride or press on the film wrapped around the drum. While the outer part of each head can still be magnetically screened the actual inner part, essentially the gap, pressing against the film is unscreened. It will be appreciated that the power in the recording head is, relatively speaking, high and it is inevitable with recording and reproducing heads in such close proximity that stray magnetic fields from the recording head will interfere with the sensitive playback head unless preventive measures are taken.

In the known photographic sound film speed stabilizing mechanisms the drum is usually made of steel but such a drum suffers from the disadvantage that it has a "keeper" effect on the magnetic heads, that is to say, it has the effect of short-circuiting lines of force across the gaps in the heads or, at any rate, influencing the configuration of these lines to an objectionable degree.

The object of the present invention is to provide magnetic sound-on-film apparatus having magnetic heads pressing or riding on the record carrier passing around the drum which not only overcomes the disadvantage of the keeper effect mentioned above but, in particular, provides a magnetic screening for the heads in such a way that the objectionable cross-talk interference effect is completely eliminated.

To do this, it is desirable to choose a non-magnetic material from which to make the drum. However, even with some non-magnetic materials (for example, the metallic non-magnetic materials) it can happen that eddy current disturbances may arise particularly when a thin-base magnetic-layer carrier is employed.

Thus, it is preferred to use insulating materials from which to make the drum. Eminently suitable materials are, for example, the artificial plastics or artificial resins such as phenolformaldehyde condensation products, or products made up of laminations of cloth or paper bonded by such synthetic plastic substances.

While the use of such a non-conducting material for the drum overcomes the keeper and eddy current effects, the lines of force from the recording head can easily pass through it and influence the reproducing head.

It is therefore necessary to provide magnetic screening within the drum itself to prevent the possibility of cross-talk between the recording and reproducing heads. The screening material must be made of a substance which is magnetically soft in order to obtain the best results.

According to this invention stationary shields of magnetically soft material are provided in a recess in the drum, which is constructed of non-magnetic material, and these shields act as a magnetic screen, or part of such screen, for the head or heads.

As mentioned above, it is preferred to use an insulating material from which to construct the drum and to insert the magnetic shields in the hollow interior of the drum, the shields being held in place, for example, by being fixed to a stationary part of the whole equipment.

The magnetic shields can be shaped as segments of a cylinder or, if the recess in the interior of the drum is large enough, they can be flat plates fixed opposite the gaps in the magnetic heads. The shields should preferably be spaced far enough apart to prevent any magnetic circuit between them.

Figure 2:
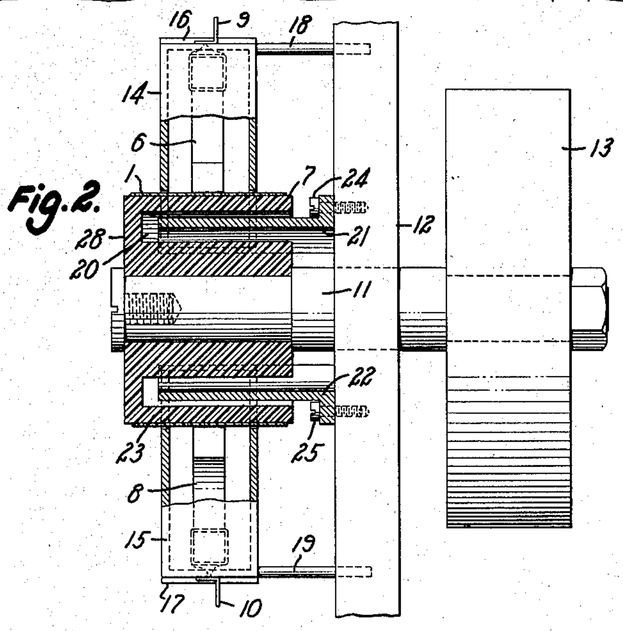

In order that the present invention may be clearly understood and readily carried into effect it will now be described, by way of example only, with reference to the accompanying drawings, wherein:

Fig. 1 is a perspective view, in part broken away, of a constructional embodiment of the invention illustrating the stationary magnetic screening shields disposed within the recess in the drum; and Fig. 2 is an end elevation of a portion of the structure of Fig. 1 with a part of the apparatus shown in section.

Referring now to the accompanying drawings, these illustrate apparatus for recording and reproducing sound magnetically and embody the present invention. The magnetic recording medium is shown at 1 and consists, for example, of a film coated with a magnetic layer 2 and provided with sprocket perforation holes 3 by which it is drawn through the apparatus by means of a sprocket roller 4 driven by a suitable source of power.

In the example illustrated the film 1 is drawn by the sprocket roller 4 around a sprocket 5, under a recording head 6, around a drum 7 and past a reproducing head 8 in the direction shown by arrows 26 and 27.

The signal currents to be recorded are fed into the recording head 6 at terminals 9 and recorded in the usual manner on the magnetic layer 2 carried by the film 1.

The magnetically recorded signals are picked up by the reproducing or playback head 8 and the induced signal currents are fed from terminals 10 to an amplifier and reproduced in the customary way.

To achieve a constant film speed with very low flutter content a film speed stabilizing device is used of the kind in which the shaft 11 of the drum 7, around which the film 1 passes and which is driven solely by the film itself, carries a speed stabilizing flywheel 13. The effect of this system is to add inertia to the film (which in itself is virtually without mass) and this arrangement serves to maintain the film velocity at the recording and reproducing points substantially constant.

The recording and reproducing heads 6 and 8 are provided with stationary screening cans 14 and 15 made, for example, of magnetically soft material. The cans 14 and 15 are mounted on spring arms 16 and 17 which are carried by rods 18 and 19 fixed to a wall member 12 forming part of the apparatus. The spring arms 16 and 17 press the magnetic heads on to the coating 2 on the film 1 so that the heads ride thereon as the film passes around the drum 7.

The can casings 14 and 15 in Fig. 1 are shown partly broken away for the purposes of better illustration and it will be seen that it is impossible to provide a cover for the cans immediately in front of gaps 6′ and 8′ in the magnetic heads 6 and 8.

While the recording is in progress the magnetic field emanating from the recording head 6 is relatively strong and as the drum 7 is made of a non-magnetic and preferably non-conductive material, for the reasons already described, this material does not prevent the magnetic lines of force from the head 6 spreading through it and reaching the playback head 8, thus causing the cross-talk effect, if allowed to do so.

However, to overcome this difficulty and in accordance with this invention, a recess 20 (shown to better advantage in Fig. 2) is made in the drum 7. This recess 20 provides the space for separate magnetic screening shields 21 and 22 to be positioned within the drum and opposite the gaps 6′ and 8′ in the magnetic heads 6 and 8.

The shields 21 and 22 are made of magnetically soft material and function as a magnetic screen, or part of such a screen; in particular, they protect the gap 8′ in the reproducing head 8 from the cross-talk effect which would otherwise be caused by the relatively strong magnetic field coming from the recording head 6. In addition, the screening shield 22 protects the reproducing head 8 from stray magnetic fields from ancillary components of the apparatus such as electric driving motors.

In the embodiment of the invention illustrated the shields 21 and 22 constitute, magnetically, stationary covers or lids for the cans 14 and 15. For purposes of better illustration the side wall 28 of the drum 7 is shown partly broken away in Fig. 1 and it will be seen that it is preferred to make the outer annular portion 23 of the drum 7 as thin as is mechanically practical so as to position the shields 21 and 22 as close to the magnetic heads as possible in order to provide the maximum magnetic shielding; the shields 21 and 22 are preferably formed as segments of a cylinder co-axial with the drum 7 in order to enable them to be so located, and they are rigidly connected to the stationary wall member 12 by means of screws 24 and 25, the member 12 forming a partition between the drum 7 and flywheel 13 which are both mounted on the same shaft 11.

In order to obtain a proper magnetic screening effect it is advisable to provide a separate shield for each head. Each shield 21 or 22 should be separated from the other far enough to ensure that the magnetic resistance between them is made sufficiently high to prevent any magnetic circuit between them for all practical purposes.

We claim:

1. In magnetic sound recording and reproducing apparatus, a rotatable drum of non-magnetic material, means for supporting and moving an elongated record carrier of magnetic type with a portion thereof extending partially around said drum, a magnetic head supported adjacent said drum for cooperation with a record carrier in transit on the drum, and magnetic shielding means for said magnetic head; said drum having an annular concentric recess opening from one side of the drum in the region of the periphery thereof, and said shielding means including a stationary member of magnetically soft material extending into said recess at the portion thereof opposite said magnetic head.

2. In magnetic sound recording and reproducing apparatus, the invention as recited in claim 1, wherein said shielding means includes a can of magnetically soft material enclosing said magnetic head and having an open end adjacent the path of the record carrier; said stationary member constituting a magnetic closure for said can.

3. In a magnetic sound recording and reproducing device, the invention as recited in claim 1, wherein said drum is of insulating material.

4. In a magnetic sound recording and reproducing device, a rotatable record carrier drum of non-magnetic material having an annular concentric recess opening from one side of said drum in the region of the periphery thereof, a pair of magnetic heads spaced circumferentially of said drum for cooperation with an elongated record carrier passing around the drum, and means magnetically shielding said magnetic heads; said shielding means including stationary members of magnetically soft material within the recess of said drum and opposite the respective magnetic heads.

5. In a magnetic sound recording and reproducing device, the invention as recited in claim 4, wherein one magnetic head is a recording head and the other is a reproducing head, and said heads are located at substantially diametrically opposed regions of said drum.

6. In a magnetic sound recording and reproducing device, the invention as recited in claim 4, in combination with a shaft carrying said drum, a flywheel on said shaft, a wall member supporting said shaft for rotation and extending between said drum and flywheel, and wherein said stationary shield members are supported on said wall member.

OTTO KURT KOLB.
ERIC OWEN SMITH.

No references cited.